Patented Nov. 7, 1939

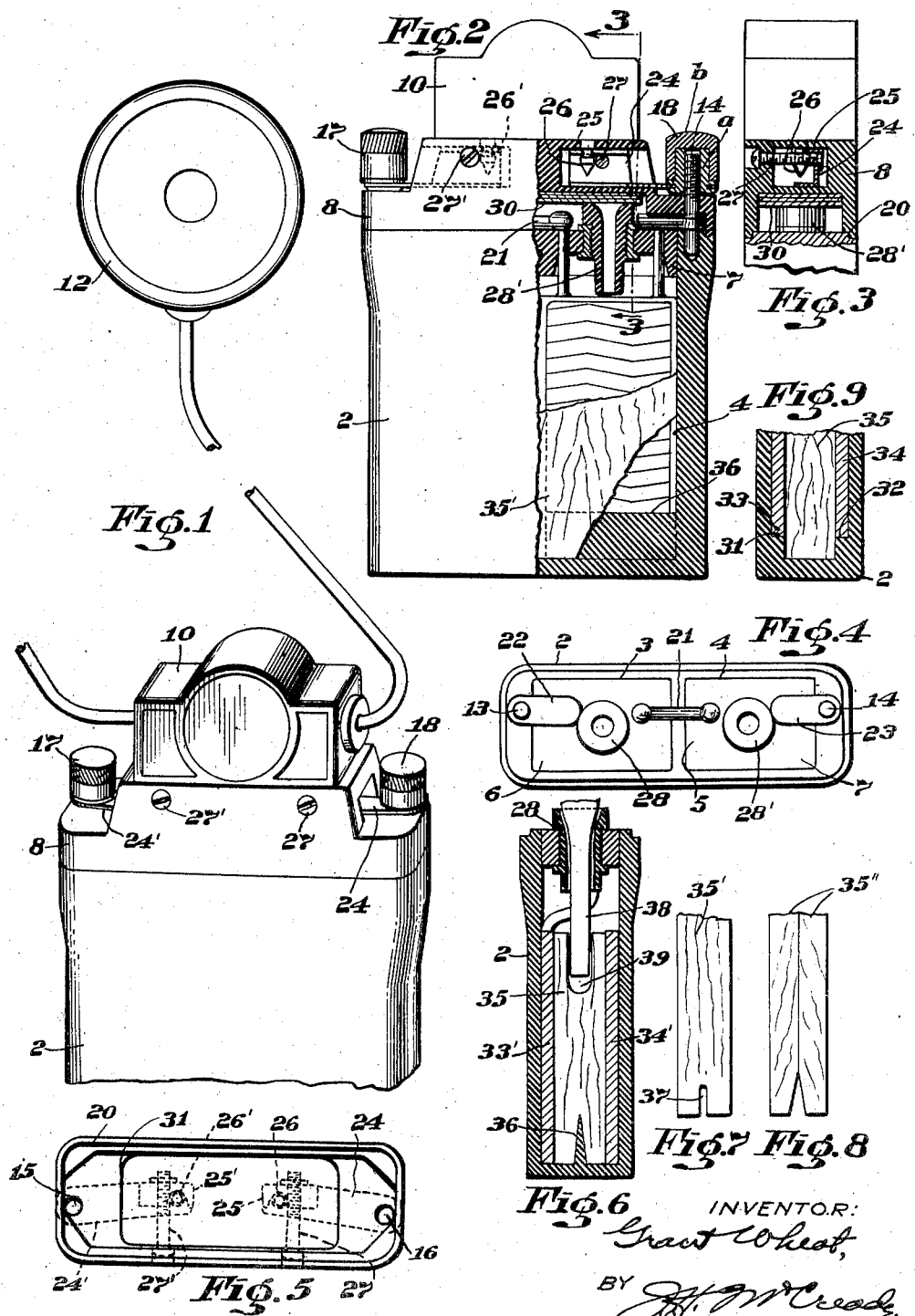

2,179,393

UNITED STATES PATENT OFFICE 2,179,393

STORAGE BATTERY FOR HEARING-AIDS

Grant Wheat, Marlboro, Mass., assignor to Koehler Manufacturing Company, Marlboro, Mass., a corporation of Massachusetts Application September 27, 1935, Serial No. 42,477

4 Claims. (Cl. 136—170)

This invention relates to apparatus designed for use by deaf persons to aid them in hearing. The most effective type of such apparatus operates on the telephone principle and consequently depends upon a source of electric energy. It has been customary heretofore to use dry cells for this purpose. This present invention aims to devise a storage battery that will meet the requirements of hearing-aids of the electrical type so that the longer life, greater reliability and other advantages of a storage battery, as compared to a chemical dry cell, can be made available for these purposes.

In order to satisfy these requirements, the storage battery must be small enough to be carried conveniently in the pocket, must be very light in weight, strong enough to withstand an occasional accidental dropping, easy to fill and charge, and above all, must be proof against leakage and corrosion. To devise a battery that will fulfill these requirements constitutes the chief object of this invention.

The nature of the invention will be readily understood from the following description when read in connection with the accompanying drawing, and the novel features will be particularly pointed out in the appended claims.

In the drawing:

Figure 1 is a perspective view of a portion of a storage battery and an amplifier combined;

Fig. 2 is a view, partly in side elevation and partly in vertical section, of the battery illustrated in Fig. 1;

Fig. 3 is a sectional view through the closure and cover of the battery on approximately the line 3—3, Fig. 2;

Fig. 4 is a plan view of the battery with the cover removed;

Fig. 5 is a view of the cover in an inverted position;

Fig. 6 is a transverse, vertical, sectional view of the battery shown in Fig. 2;

Figs. 7 and 8 are side views of the lower portions of different forms of separators that can be used in the battery; and Fig. 9 is a transverse, sectional view of a slightly different form of battery.

The battery shown comprises a jar 2 which may be made of Bakelite, vulcanite, or any other suitable material having the necessary insulating properties and adapted to be molded into the desired form. It is relatively thin and flat and of such dimensions as to conveniently fit in a vest pocket. In the particular form shown two chambers are provided to receive the battery elements, thus providing two cells, as indicated at 3 and 4, respectively, Fig. 4, these cells being separated by a partition 5. The upper ends of the cells are closed by soft rubber gaskets or closures 6 and 7, fitting tightly into the ends of the chambers, and the leads for the plates are led through these gaskets. So far as these features are concerned the construction is similar to those shown in my prior patents, except for the matter of dimensions.

This battery also includes a cover 8 which is removably secured to the jar 2 and forms a convenient support for the amplifier 10 to which the transmitter (not shown) and the receiver 12 of the hearing-aid are connected. Preferably the parts that secure the amplifier, cover and jar together mechanically are also utilized to connect these elements electrically.

For this purpose screw threaded terminal binding posts 13 and 14, Fig. 4, are molded or otherwise secured in the wall of the jar and project above its top at opposite ends thereof. They are adapted to extend through holes 15 and 16, respectively, Fig. 5, in the cover 8, and to receive insulated thumb nuts 17 and 18 by means of which the cover is secured to the jar. Preferably both studs 13 and 14 are offset laterally from the center line of the jar, as shown in Fig. 4, and the holes are correspondingly placed so that it is impossible to make the cover fit properly on the jar except in one position. Also, the lower margin of the cover is grooved, as shown at 20, and the top of the jar is correspondingly shouldered to facilitate the centering of the cover on the jar. The leads from the plates of the two cells are connected together by the intermediate member 21, Figs. 2 and 4, and the other terminals are connected by bars or straps 22 and 23, Fig. 4, to the respective posts 13 and 14, so that these posts form the electrical terminals of the battery.

The connection between the terminal 14 and the amplifier 10 includes a special connector 24, Figs. 2, 3 and 5. It is made of sheet metal, such as copper or brass, is bent to the peculiar shape shown, and includes a bottom plate to which the lower end of the core $a$ for the nut 18 is attached by a loose connection which prevents the separation of these members but permits the part $a$ to rotate in the extension of the bracket. The insulating cap $b$ for the nut 18 is molded on to the core $a$. The connector extends into an aperture or cavity formed in the cover 8, and is provided with a turned-over edge portion 25 that is cut out, as shown in Fig. 5, to receive the terminal stud 26 which is rigid with, and projects downwardly from, the amplifier 10. Projecting laterally into the cover is a screw 27, the inner end of which is threaded into the upright portion of the connector 24, so that by turning this screw up, the part 25 of the connector can be tightened into the grooved portion of the stud 26 and thus will make a good electrical connection with it and also lock it mechanically to the cover 8. The same construction is used at the opposite end of the cover to cooperate with the nut 17 and stud 13, and these parts are indicated in Figs. 1, 2 and 5 by the same, but primed, numerals.

It will be observed that with this arrangement the amplifier 10 is normally secured rigidly to the cover 8, and these two parts can be disconnected, as a unit, from the battery jar by unscrewing the nuts 17 and 18. At the same time these parts can be separated, if desired, by backing out the screws 27'—27' far enough to release the studs 26'—26'. In charging the battery the cap or cover may either be disconnected and the battery placed on charge, or the terminals of the charging circuit may be connected to the battery terminals 13 and 14 without removing the cap.

The cell chambers must be vented, and for this purpose vent tubes 28 and 28', Figs. 2 and 4, are mounted in the closures 6 and 7, and their upper ends are flared out or enlarged for engagement with a pad 30 of absorbent fibrous material. This pad may conveniently consist of a layer of felt or of several sheets of blotting paper, superposed one upon another, and fitting tightly into the recess 31, Fig. 5, in the lower side of the cap or cover 8. The pad should be sufficiently thick to tightly close the upper ends of the vent tubes when the cap is in place. It provides the necessary escape for gas or vapor created in the battery, but absorbs any moisture or acid that may find its way through the vent tube. Preferably practically all of the electrolyte in the battery is held in an absorbed condition so that the total quantity of free solution in the battery consists of only a few drops, and the pad 30 is made sufficiently large to be capable of absorbing all of this free solution. Thus the escape of any acid to the outside of the battery is definitely prevented.

This arrangement also provides for the convenient filling of the battery with distilled water to replenish the loss of liquid due to evaporation. Water for this purpose can be introduced through the vent tubes 28 and 28', and the lower ends of these tubes are located so close to the upper ends of the plates in the separators that over-filling is prevented. If the pad 30 becomes wet to any substantial degree it can readily be replaced.

In this connection it may be pointed out that the connectors 24 and 24' are separated from the chamber in which the pad 30 is located by a transverse partition, and that the only metal parts exposed to contact with the gas or vapor escaping from the battery are the lead connecting elements 21, 22 and 23 and the leads from the battery plates. These parts are not likely to be injured by such contact.

A unique construction has been devised to minimize the danger of short-circuiting of the battery plates due to the collection of sediment in the bottom of the cell. One arrangement provided for this purpose is illustrated in Fig. 9. Here the jar 2 is provided with shoulders 31 and 32 on which the plates 33 and 34 rest. The separator 35 fills the spaces between these plates and extends down to the bottom of the cell for a distance substantially below the shoulders 31 and 32.

Another arrangement is illustrated in Figs. 2, 6, 7 and 8 where the cell 2 is provided with a central wedge-shaped flange 36 extending entirely across the bottom of the chamber from one edge thereof to the other, and the separator 35' straddles this flange, its lower edges being wedged between the bottoms of the plates and the flange. The separator may either have a saw scarf 37 in its lower end, as shown in Fig. 7, or it may be made in two pieces, as shown in Fig. 8, the lower ends of these pieces being bevelled to fit the opposite sides of the flange 36.

In both the arrangement illustrated in Fig. 9 and that shown in the other figures just mentioned, it is practically impossible for the sediment to build up to such an extent as to short-circuit the battery plates. Also, shedding of particles of solid material by the plates is minimized by the face to face contact of the separator with the plates and its tight fit with them at its lower margins.

While any suitable separating material can be used, I have found that a balsa wood separator made in accordance with the disclosure in my pending application Serial No. 26,665, filed June 14, 1935, is much superior to any other form of separator, of which I have been able to learn, in a battery designed for the present purposes. It has the high degree of absorbency necessary to hold an ample body of electrolyte in contact with the plates so that the free flowing electrolyte is reduced to a minimum, or can be eliminaed altogether; it possesses the necessary electrical properties for a good separator, it gives a long period of service, and is very useful in preventing shedding by the plates.

In the preferred arrangement, the filling of the battery is accomplished in the manner shown in Fig. 6, since capillary attraction is liable to cause drops to lodge in the vent tube if it is attempted to pour water into the battery. This difficulty is overcome by introducing water with a medicine dropper 38. The end of the dropper is inserted completely through the vent tube and far enough beyond to reach the spongy wood separator, a hole 39 being provided in the top of the separator directly below the vent tube to receive it. The point of the medicine dropper enters this hole but preferably does not touch the bottom of it. Water thus is introduced directly into the separator, and, due to the spongy nature of this member, the water is quickly absorbed until a saturated condition is reached. In this way, water is added to the battery through the vent tube and the air which it displaces is allowed to escape at the same time.

Since the hole in the separator is below the surface of the plates, it acts as a well to collect any free solution which may be in the battery. Also, by using the medicine dropper, the amount of this free solution may be determined and any excess may be removed.

While I have herein shown and described a preferred embodiment of my invention, it will be evident that the invention may be embodied in other forms without departing from the spirit or scope thereof.

No claim is here made to the novel arrangement or construction of the battery elements themselves, involving features of the battery plates, the separator, or the parts which cooperate immediately with them, these features being covered in a continuing application Ser. No. 164,638, filed September 20, 1937.

Having thus described my invention, what I desire to claim as new is:

1. A storage battery comprising a battery jar having a chamber therein, storage battery elements in said chamber, a cover for said jar, terminals for said battery anchored in the wall of said jar, means cooperating with said terminals to secure said cover removably in its operative position on the jar, a vent tube for said chamber and a body of absorbent fibrous material closing the passage through said tube and held in its operative position by said cover.

2. A storage battery comprising a battery jar having a chamber therein, storage battery elements mounted in said chamber, sealing means for said chamber located at the upper end thereof, a cover normally closing the top of said jar and resting on the upper edges of the side walls of the jar, terminal binding posts for said battery extending into the walls of said jar and anchored in said walls, and means cooperating with said terminal binding posts for securing said cover removably in said position on the jar.

3. A storage battery comprising a battery jar having a chamber therein, storage battery elements mounted in said chamber, sealing means for said chamber located at the upper end thereof, a cover normally closing the top of said jar but removably secured thereon, said cover having upper and lower compartments therein and an approximately horizontal partition separating said compartments, connectors located in said upper compartment, terminal binding screws for said battery extending into the walls of said jar and anchored in said walls connected with said elements and projecting through holes in the opposite ends of said cover, nuts threaded on said screws to clamp said cover on said battery jar, and conductors connecting said binding screws with said connectors positioned in said upper compartment.

4. A storage battery comprising a battery jar having a chamber therein, storage battery elements mounted in said chamber, sealing means for said chamber located at the upper end thereof, a cover normally closing the top of said jar but removably secured thereon, said cover having upper and lower compartments therein and an approximately horizontal partition separating said compartments, connectors located in said upper compartments, a hearing-aid amplifier mounted on said cover and provided with terminals operatively fastened to said connectors, conductors extending laterally from said battery elements and below the partition into the adjacent wall of the battery jar, means electrically connecting said conductors with said connectors above said partition, and a body of absorbent material in the latter compartment serving to absorb liquid or vapor escaping thereinto from said chamber.

GRANT WHEAT.